A. E. HENDERSON.
TUBE FOR PNEUMATIC TIRES.
APPLICATION FILED MAR. 7, 1914.
1,176,553.
Patented Mar. 21, 1916.
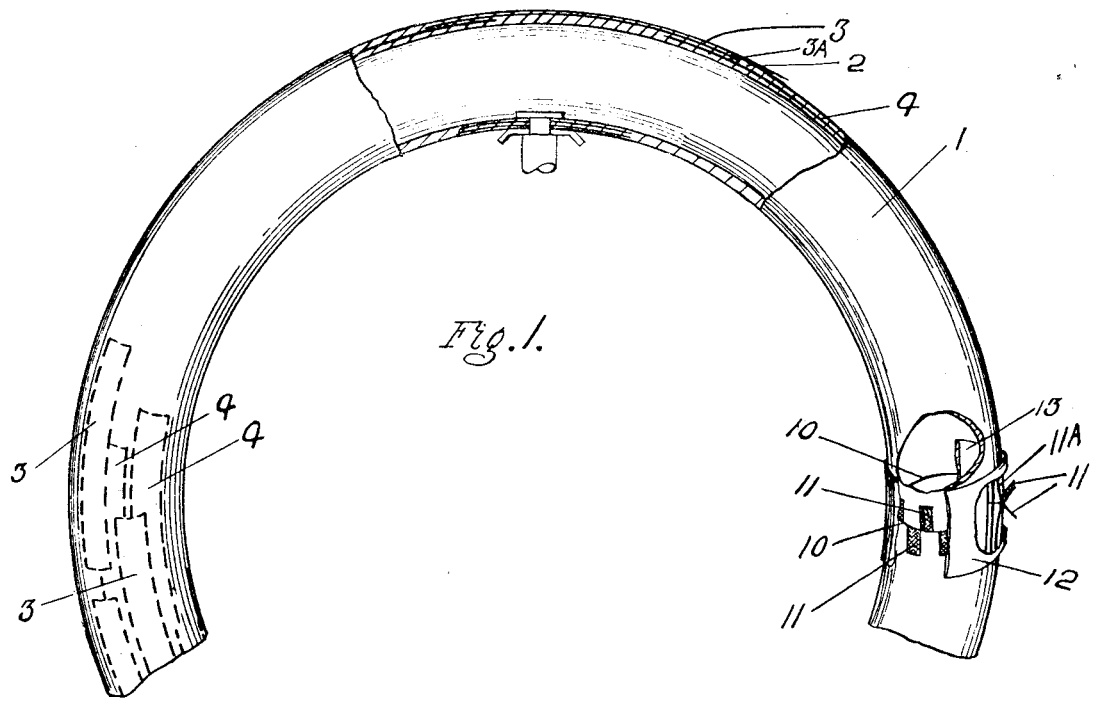
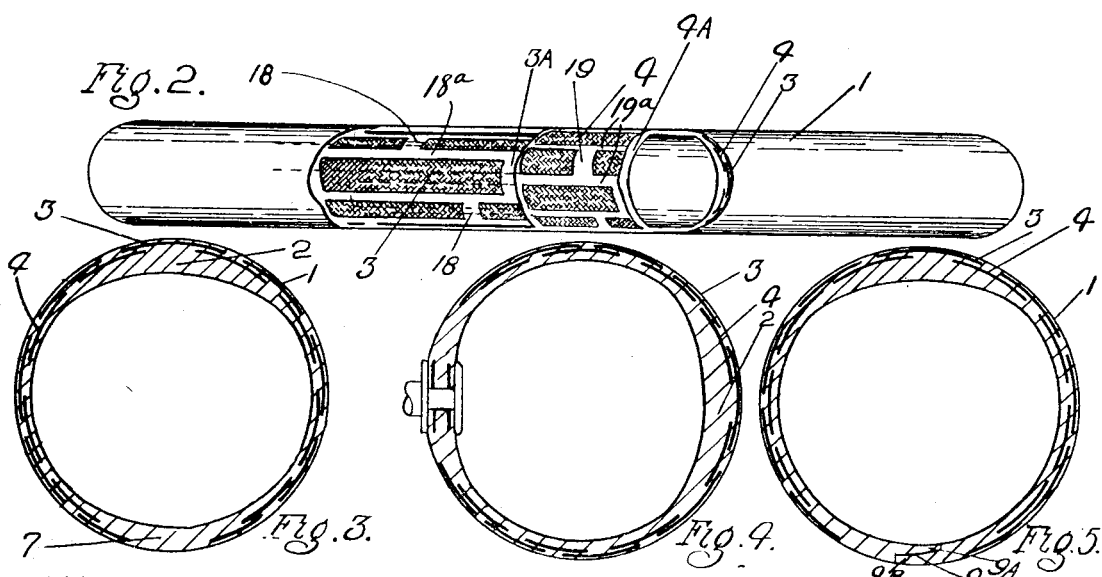
Witnesses
Inventor
Albert E. Henderson

UNITED STATES PATENT OFFICE.

ALBERT ENNIS HENDERSON, OF TORONTO, ONTARIO, CANADA, ASSIGNOR TO SUPERIOR TUBES AND ACCESSORIES, LIMITED, A CORPORATION OF CANADA.

TUBE FOR PNEUMATIC TIRES.

1,176,553.     Specification of Letters Patent.     Patented Mar. 21, 1916.

Application filed March 7, 1914. Serial No. 823,182.

*To all whom it may concern:*

Be it known that I, ALBERT ENNIS HENDERSON, subject of the King of Great Britain, and resident of the city of Toronto, county of York, Province of Ontario, in the Dominion of Canada, have invented certain new and useful Improvements in Tubes for Pneumatic Tires, and do hereby declare that the following is a full, clear, and exact description of the same, such as will enable others skilled in the art to which it appertains to make and use the same.

My invention relates to improvements in tubes for pneumatic tires in which the tread of the tube is thickened and held in compression so as to render the same proof against puncture. And the objects of my invention are,—1st, to provide a puncture proof tube which, while having the tread held in compression, yet, owing to the peculiar construction of the same, any necessary longitudinal or lateral elasticity is provided for. 2nd, to construct a tube which will be proof against blow-out, without destroying the necessary elasticity of the tube.

In the drawings Figure 1 is a perspective view of a portion of the completed tube with parts broken away. Fig. 2 is a plan view with portions broken away indicating the relation of the component parts. Fig. 3 is a sectional view of the tube showing the transverse relation of the fabric and also the thickened tread. Fig. 4 is a similar sectional view showing the construction of the tube at the valve seat. Fig. 5 is a modified form shown in cross-section indicating the longitudinal overlapping flanges opposite to the thickened tread portion.

Like numerals of reference indicate corresponding parts in each figure.

1 is an air tube for pneumatic tires having a thickened tread portion 2 gradually reducing in thickness as it extends laterally from the longitudinal center of the said tread around the sides of the tube. Adjacent to the ultimate tread surface of the tube and embedded in the said tube a suitable distance from its surface is the series 3 of fabric strips extending longitudinally in the said tread, said strips being separated longitudinally by suitable intervals 18 of unrestrained rubber. In approximately the same cross-sectional circumferential plane as the strips 3, and extending longitudinally around the said tube, are similar series of strips also marked 3 having corresponding strips on the opposite side of the tube, said strips being separated by a narrow longitudinal portion of unrestrained rubber 18$^A$, and extending laterally around the sides of the tube partially protecting such portion of the tube as would be liable to blow out through injury to the casing. These series of strips also consist of segments separated longitudinally by a portion of unrestrained rubber 18, said portion being in each case preferably in a different cross-sectional plane, thus staggering the unrestrained portions 18.

At a suitable distance from the ultimate exterior surface of the finished tube are series of strips 4, having portions of unrestrained rubber 19 and 19$^A$ to permit longitudinal and lateral expansion of the same, said strips being embedded in such manner that they overlap both longitudinally and laterally all the strips of the series 3, thus restraining the too free action of the unrestrained portions of rubber in the series 3, and together with the series 3 completely protecting the portion of the tube exposed to blow-out.

In Fig. 1 a portion of the tube has been broken away showing in section the longitudinal overlapping relation of the series of strips 3 and 4 in the tread portion of the tube. The staggered position of the strips 3 and 4 on the sides of the tube are also shown in dotted lines in the same figure.

In Fig. 2 a portion of the outer layer of rubber is broken away, showing the position of the outer series of strips 3 in their relation to each other. The layer of rubber 3$^A$ lying between the series 3 and 4 is then broken away, showing the relation of the strips of the series 4 to each other and to the series 3. The thickened portion of the tread is then shown broken away, said tread being held in compression by the series of fabric strips 3 and 4 embedded in said tread.

Figs. 3, 4 and 5 also show in detail the cross-sectional overlap of the fabric strips of the outer series 3 and the inner series 4.

In Fig. 1 is shown the method in detail of joining the two ends of the tube. The strips of canvas 11, come to the surface of the tube as shown at 11$^A$, and extend beyond the ends of the tube. A portion of each strip being cut away, the remaining portions lap over and engage the surface of the tube, holding firmly together the abutting ends of the tube at the point 10. Exteriorly applied to the tube and covering the said fabric is the thin rubber sheet 12, which has been broken away to show the overlapping relation of the strips. Similarly applied within the tube is the strip 13 which further strengthens the joint.

The tube may be constructed in the usual way, vulcanized on a circular or otherwise shaped form, and may be joined at the ends as shown in Fig. 1 or may have a circumferential unbroken tread with an annular joint 9 with overlapping flanges 9<sup>A</sup> and 9<sup>B</sup> opposite to the same as shown in Fig. 5.

Upon the tube being reversed and inflated longitudinal and lateral compression of the tread will be produced, and owing to the longitudinal and lateral overlapping of the fabric strips a more elastic construction will be provided without destroying the necessary compression, while the portion of the tube exposed to puncture or blow-out is protected by one or other of the series of fabric strips, thus eliminating the possibility of blow-out of the inner tube.

It must be understood I do not confine myself to the exact construction as shown, particularly as regards the relation of the various strips of fabric to each other, as the construction may be varied without departing from the spirit of my invention.

What I claim, as new, is:—

1. An inner tube for pneumatic tires, having a thickened tread portion and having embedded within and with rubber interposed a plurality of longitudinally and laterally overlapped fabric strips, said strips holding the tread portion in compression.

2. An inner tube for pneumatic tires, having a thickened tread portion and having embedded in the tread portion and also as a protection against blow outs through the sides of the tube a plurality of longitudinally and laterally overlapped fabric strips, said strips in the tread portion holding the tread portion in compression.

3. An inner tube for pneumatic tires, having a thickened tread portion and having embedded within the body of the tube a plurality of longitudinally and laterally overlapped fabric strips, the strips in the tread portion holding the tread portion in compression.

4. An inner tube for pneumatic tires, having a thickened tread portion and having embedded within the tube adjacent the outer surface thereof a plurality of longitudinally and laterally overlapped fabric strips, said strips holding the tread portion in compression.

5. An inner tube for pneumatic tires, having a thickened tread portion, superposed alternating series of fabric strips embedded in the tube with rubber interposed, the strips being out of contact with one another and holding the tread portion in compression.

6. A tube for pneumatic tires, having a thickened tread portion held in compression by means of overlapped fabric strips longitudinally embedded in the tube, said strips being arranged in superposed series and those in the same plane being separated by portions of unrestrained rubber to permit longitudinal and transverse expansion of the tube.

7. A tube for pneumatic tires, having a thickened tread, said tread being held in compression and the tube also protected from blowout by means of transversely and longitudinally overlapped fabric strips, and those strips in the same plane being separated by unrestrained rubber to permit longitudinal and lateral transverse expansion of the tube.

8. A tube for pneumatic tires, having a thickened tread and also having an abutting joint strengthened by means of overlapping portions of an outer series of fabric strips extending beyond the joint, and means for protecting the overlapped projecting strips.

9. A tube for pneumatic tires having a thickened tread portion held in compression and its side walls protected against blow out by overlapping strips of flexible inelastic material, said tube being permitted longitudinal and transverse extension.

In testimony whereof I have hereunto affixed my signature in the presence of two witnesses.

ALBERT ENNIS HENDERSON.

Witnesses:
J. L. ATKINSON,
A. KEMISH.